J. WENNSTROM.
SWIVEL.
APPLICATION FILED SEPT. 6, 1907.
925,406.
Patented June 15, 1909.
Fig. 1.
Fig. 2.
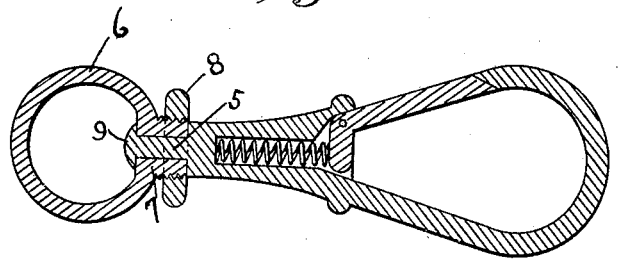
Fig. 3.
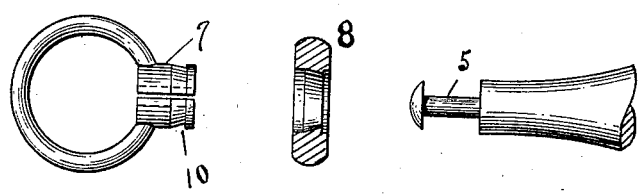
Attest:
Inventor:
John Wennstrom
by Howson and Howson
Attys.

UNITED STATES PATENT OFFICE.

JOHN WENNSTROM, OF SUFFERN, NEW YORK.

SWIVEL.

No. 925,406.

Specification of Letters Patent.

Patented June 15, 1909.

Application filed September 6, 1907. Serial No. 391,648.

*To all whom it may concern:*

Be it known that I, JOHN WENNSTROM, a citizen of the United States of America, residing in Suffern, in the county of Rockland, in the State of New York, have invented certain new and useful Improvements in Swivels, of which the following is a specification.

The object of this invention is to provide a safety swivel adapted for use in connection with watch chains, fobs and the like, although serviceable in any connection in which a ring swivel is desired.

The particular feature of my improvement is the integral ring and split neck which surround the swivel pin, in combination with a bolt or like means for preventing the neck segments from spreading.

In the accompanying drawings in which my invention is illustrated Figure 1 is a vertical section of a swivel catch to which my invention is applied, and Fig. 2 is a side elevation of so much of the same, the parts detached, as incorporates my invention; Fig. 3 is a section of a modification.

Referring to the drawings it will be seen that in my improved swivel applied to a snap catch for a watch or charm, the swivel pin 5 is carried as usual by the body of the catch. The chain ring 6 however instead of being made integral with the neck or bearing 7, on only one side and then bent around to form the ring as is customary, and dangerous, is made integral therewith on both sides. The neck is slit vertically and thus whether made of soft or tempered metal may be readily sprung open to permit the insertion of the swivel pin 5 after which the nut 8 is secured around the neck and prevents the head 9 of the swivel pin from pulling through. The nut may be conveniently threaded on the exterior of the neck 7 as shown, but any method of securing the nut around the neck is within the scope of my invention. Thus in Fig. 3 the nut slides over the neck and is held in position by the spring catch 10.

To assemble the parts, the ring 8 is passed over the swivel pin and slipped upon the body of the catch; after the pin has been passed through the bearing 7 the ring is then screwed on the latter as shown in Fig. 1 or pushed down to snap the catch shown in Fig. 3.

I claim as my invention:

A swivel comprising a split ring having terminal lugs adapted to form a bearing for a swivel pin and formed to receive and hold a clamping ring, in combination with the clamping ring coöperating with said lugs, a snap hook provided with the swivel pin adapted to be carried by said bearing, the shank of said hook being shaped to receive the clamping ring during the adjustment of said swivel pin in its bearing, substantially as described.

In testimony whereof I have signed my name to this specification, in the presence of two subscribing witnesses.

JOHN WENNSTROM.

Witnesses:
ALFRED S. BUSH,
J. E. SHERWOOD.